United States Patent

Le et al.

[11] Patent Number: 5,926,336
[45] Date of Patent: *Jul. 20, 1999

[54] METHOD AND APPARATUS FOR REWRITING SERVO INFORMATION ON A DISK IN A HARD DISK ASSEMBLY

[75] Inventors: Me Van Le, Milpitas; Jong-Ming Lin, Cupertino, both of Calif.

[73] Assignee: Samsung Electronics Co., Ltd., Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/710,241

[22] Filed: Sep. 13, 1996

[51] Int. Cl.$^6$ .................................................. G11B 21/08
[52] U.S. Cl. .......................................... 360/75; 360/77.08
[58] Field of Search .............................. 360/77.08, 77.07, 360/77.02, 77.05, 75

[56] References Cited

U.S. PATENT DOCUMENTS

| | | | |
|---|---|---|---|
| 5,036,408 | 7/1991 | Leis et al. | 360/48 |
| 5,255,136 | 10/1993 | Machado et al. | 360/77.08 |
| 5,333,140 | 7/1994 | Moraru et al. | 360/75 |
| 5,448,429 | 9/1995 | Cribbs et al. | 360/75 |
| 5,570,247 | 10/1996 | Brown et al. | 360/77.05 |
| 5,581,420 | 12/1996 | Chainer et al. | 360/75 |
| 5,606,469 | 2/1997 | Kosugi et al. | 360/77.04 |
| 5,615,058 | 3/1997 | Chainer et al. | 360/75 |
| 5,659,436 | 8/1997 | Yarmchuk et al. | 360/77.08 |
| 5,710,677 | 1/1998 | Teng et al. | 360/75 |
| 5,771,130 | 6/1998 | Baker | 360/75 |
| 5,798,883 | 8/1998 | Kim | 360/75 |

*Primary Examiner*—Nabil Hindi
*Attorney, Agent, or Firm*—Blakely Sokoloff Taylor & Zafman

[57] ABSTRACT

The present invention is a method and apparatus for rewriting servo information on a disk of a hard disk drive. The new servo pattern is written on the tracks on the heads or sides of a disk pack using the stagger wedge scheme. When the read/write heads reach the first track beyond the inner diameter crash stop of the disk pack, the first read/write head is directed to write the new servo information, followed by the writing of data in each sector of the entire track, while the other read/write heads remain deactivated. The data writes over any pre-existing servo information on the track. Next, the second read/write head is directed to write the new servo information, followed by the writing of data in each sector of a complete track while the other read/write heads are deactivated. During the power-on sequence, the read/write heads are directed to the portions of the disk beyond the inner diameter crash stop, where the new servo pattern and the new data have been written, so as to read the new servo pattern.

7 Claims, 8 Drawing Sheets

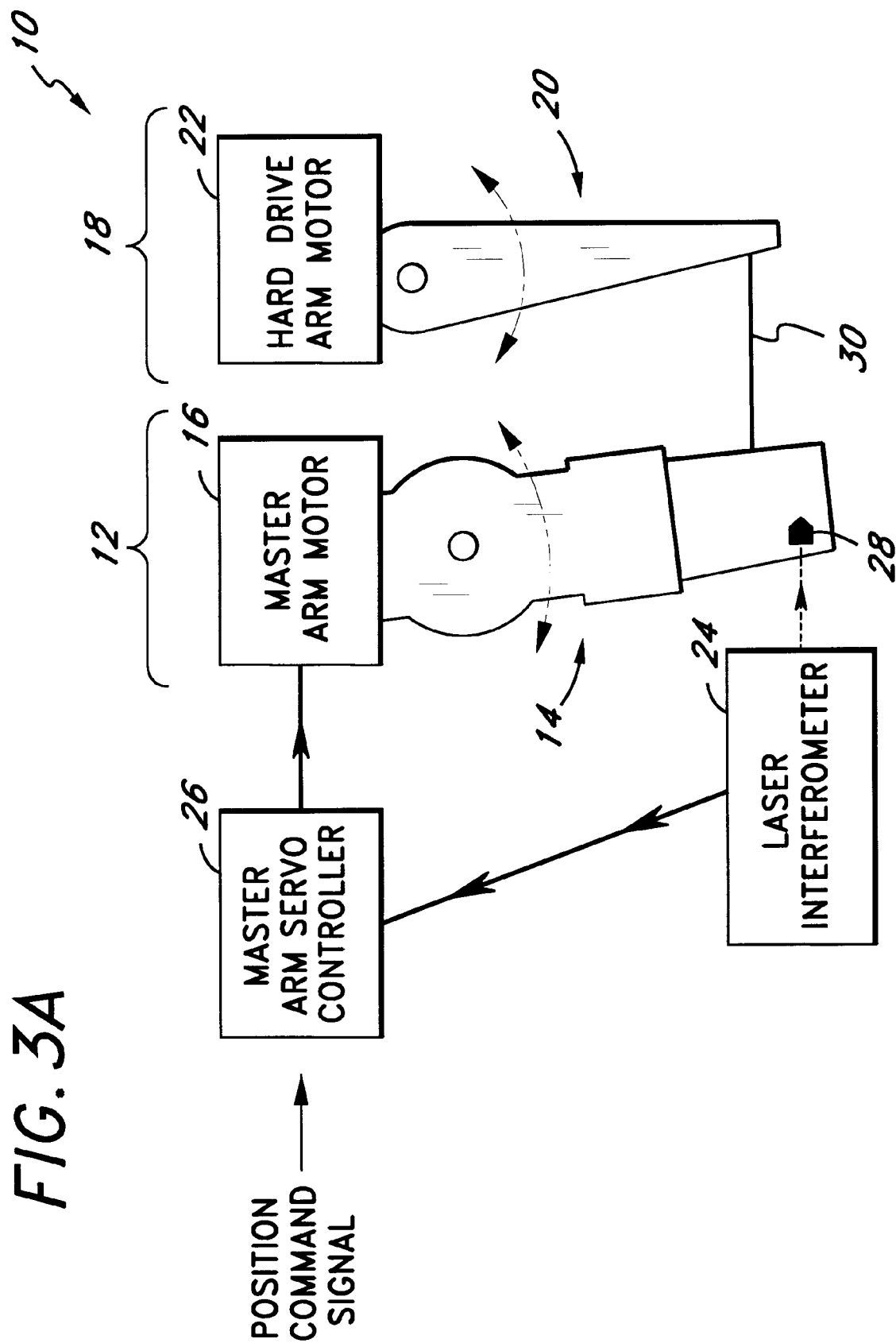

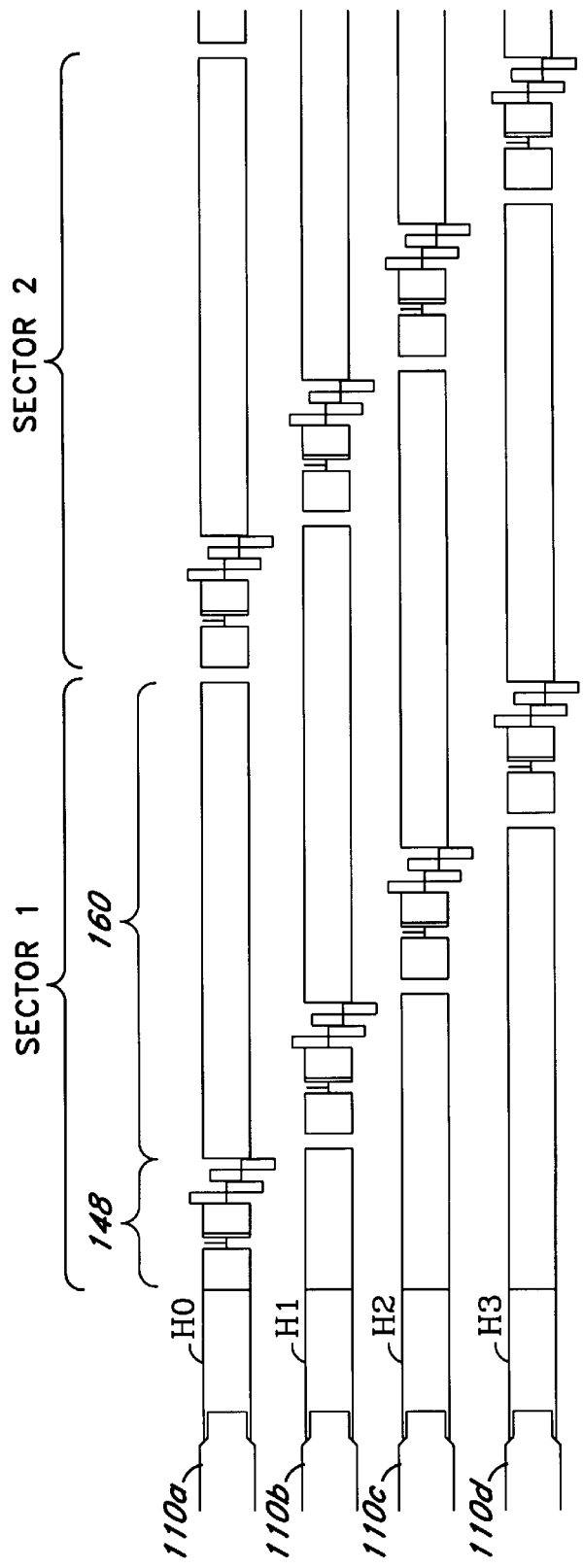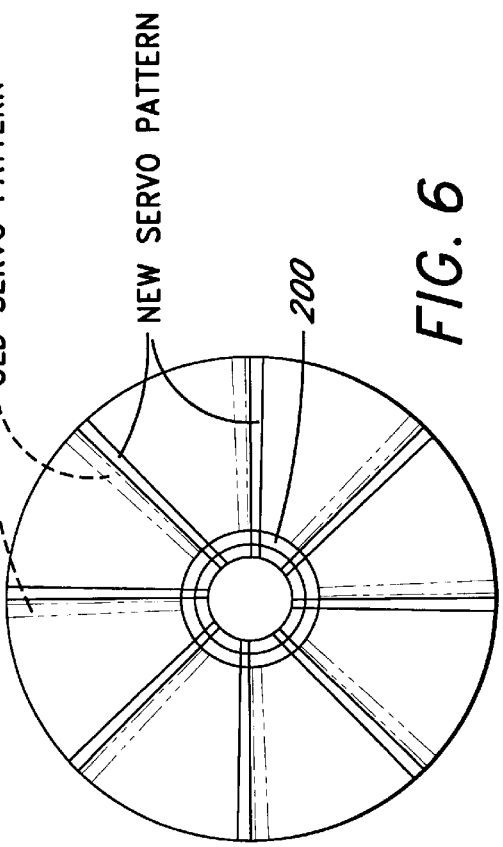
FIG. 5B
FIG. 6

METHOD AND APPARATUS FOR REWRITING SERVO INFORMATION ON A DISK IN A HARD DISK ASSEMBLY

BACKGROUND OF THE INVENTION

1. Field of the Invention

The present invention relates in general to disk storage systems and more particularly, to a method and apparatus for rewriting servo information on a disk in a hard disk drive assembly.

2. Description of the Related Art

Disk drives are magnetic recording devices used for the storage of information, or data. The data is typically recorded on concentric tracks on either surface of one or more magnetic recording disks. To facilitate the storage and retrieval of the data in an orderly manner, disks are typically organized in blocks called sectors. These sectors are located on the disk by a set of unique specifiers called cylinder (or track), head (or side) and sector number. The disks are rotatably mounted to a spin motor and information is accessed by means of read/write heads that are mounted to actuator arms which are rotated by a voice coil motor. The voice coil motor is excited with a current to rotate the actuator and move the heads to a desired radial position for writing data into, or reading data out of, a selected track.

The movement of the actuator is controlled by a servo system, utilizing servo information recorded on one or more of the magnetic recording disks. By reading this servo information, the actual radial positions of the heads can be determined, and after comparison with the desired head radial positions, control signals can be sent to move the actuator accordingly. Servo information is typically stored on a disk in one of two ways. In the first, a dedicated servo system, a set of several tracks on the disk or the entire disk surface, is reserved exclusively for storing information associated with the characteristic of the particular drive. Such information includes servo parameters and read/write channel parameters. A servo head reads this information to provide a continuous signal indicating the position of the servo head with respect to the servo disk. In the second type of servo system, referred to in the are as an embedded servo system, sectors of servo information are interspersed with sectors of data on each disk surface. As a read head follows the data track around, it regularly reads a fresh sample of servo information from each servo sector with which to control its position.

Due to power consumption, cost and throughput concerns, a particular type of embedded servo system, known as the "stagger wedge" servo system is used in the disk drive industry. In the stagger wedge servo system, the servo information written on each head or side of a disk are not aligned. Instead, they are staggered. As shown in FIG. 1, the servo information stored on a track of one disk head is phase shifted from the servo information stored on the same track of another disk head.

For example, in writing the servo patterns on a four-head, stagger wedge hard disk drive, read/write (R/W) head 1 is first activated and directed to write a particular servo pattern in sector 1, head (or side) H0, track 1, of the disk pack in a hard drive assembly. Upon completion of the servo writing process, R/W head 1 is deactivated. R/W head 2 is then activated and directed to write the servo pattern in sector 1, head (or side) H1, track 1 of the disk pack. Upon completion of the servo writing process, R/W head 2 is deactivated. The same process is continued for R/W head 3 and R/W head 4 in sector 1, head (or side) H2, track 1 and sector 1, head (or side) H3, track 1 of the disk pack respectively. Thus, the servo pattern all four disk heads of the disk pack are written during a particular sector cycle.

By activating one R/W head at a time, the stagger wedge servo writing scheme may be used to efficiently complete servo writing an entire cylinder with minimum power consumption. However, this servo writing scheme presents a significant problem when used to rewrite servo information on a disk pack in a hard drive assembly. In particular, since only one R/W head (for example R/W head 1) is turned on at a particular time, the remaining heads (for example, R/W heads 2–4) are inactive. As a result, the data fields in sector 1, heads H1–H3 of the disk pack will not have any data recorded on them. When a new servo pattern is written over the disk pack, two servo patterns, the old and the new patterns, will co-exist on the disk pack, as shown in FIG. 2, resulting in confusion during an attempt to read the reworked disk.

One approach in solving this problem is to erase the information stored on the entire disk pack prior to rewriting servo patterns on the disk pack. However, this significantly reduces throughput and thus, the manufacturing productivity of hard disk drives.

Accordingly, there is a need in the technology for a method and apparatus for rewriting servo information on a disk pack in a hard drive assembly without first having to erase the entire disk pack.

BRIEF SUMMARY OF THE INVENTION

The present invention is a method and apparatus for rewriting servo information on a disk of a hard disk drive assembly. The new servo pattern is written on the tracks on the heads or sides of a disk pack using the stagger wedge scheme. When the read/write heads reach the first track beyond the inner diameter crash stop of the disk pack, the first read/write head is directed to write the new servo information, followed by the writing of data in each sector of the entire track, while the other read/write heads remain deactivated. The data writes over any pre-existing servo information on the track. Next, the second read/write head is directed to write the new servo information, followed by the writing of data in each sector of a complete track while the other read/write heads are deactivated. During the power-on sequence, the read/write heads are directed to the portions of the disk beyond the inner diameter crash stop, where the new servo pattern and the new data have been written, so as to read the new servo pattern.

BRIEF DESCRIPTION OF THE DRAWINGS

FIG. 3A illustrates a servo writing system which implements the method of the present invention.

FIG. 5B illustrates a servo sector of a disk in a disk pack having four heads, with servo information written using the stagger wedge servo writing scheme.

FIG. 6 is a top view of a disk pack that is re-servo written in accordance with the teachings of the present invention.

DETAILED DESCRIPTION OF THE INVENTION

Figure 1:
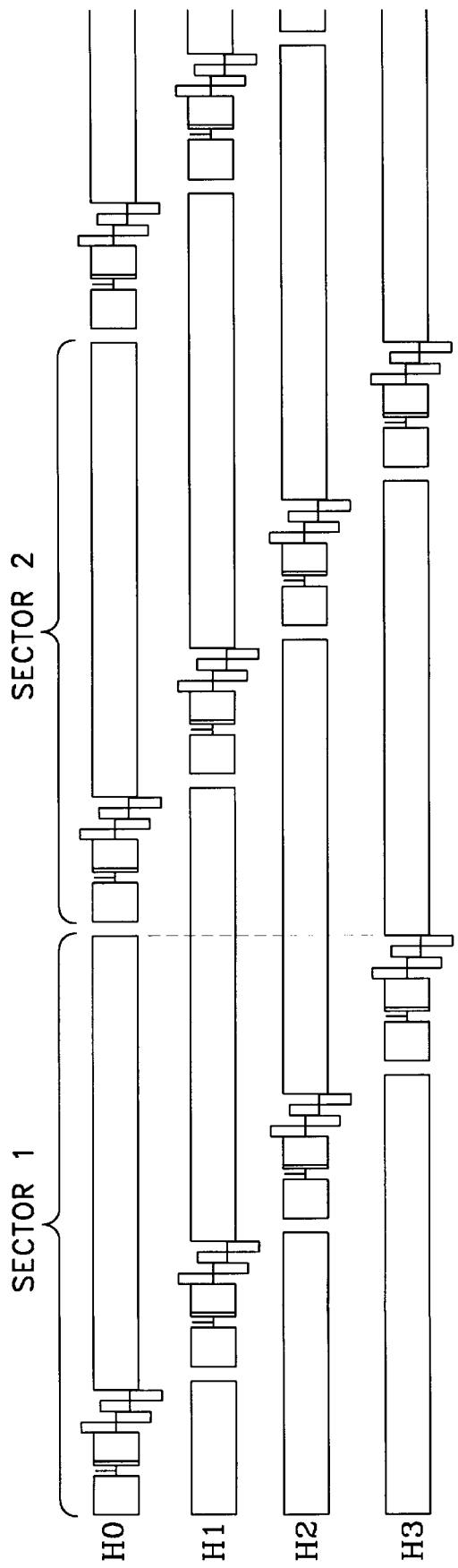
FIG. 1 illustrates the servo patterns on a disk pack of a hard drive assembly written using the stagger wedge servo writing system of the prior art.
Figure 2:
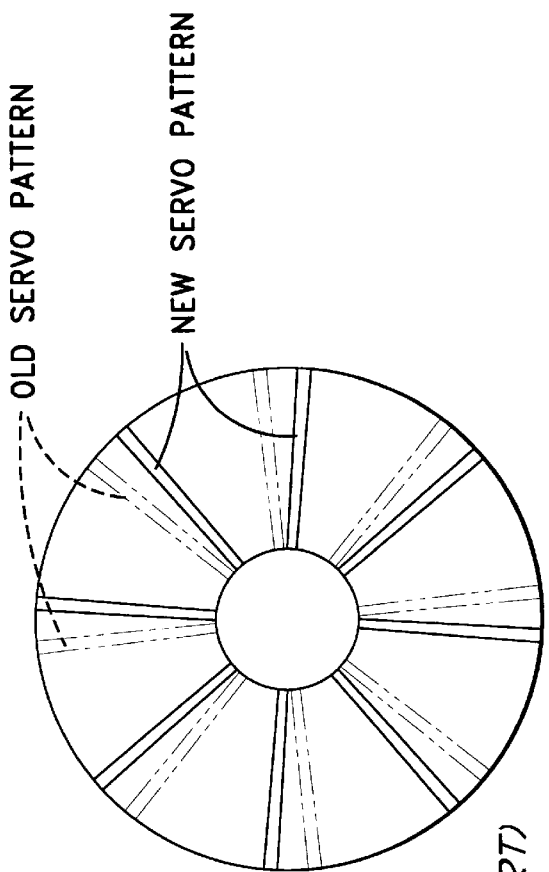
FIG. 2 illustrates the coexistence of old and new servo patterns on a disk pack using the stagger wedge servo writing system of the prior art.

Referring to the drawings more particularly by reference numbers, FIG. 3A illustrates a servo writing system 10 which implements the re-servo writing process of the present invention. The servo writing system 10 directs the re-servo writing process by positioning the read/write heads in a magnetic disk drive from a master arm and motor. The servo writing system 10 includes a master drive assembly 12 which includes a master arm 14 that has a master voice coil motor 16. The servo writing system 10 also comprises a hard drive assembly 18 which includes a hard drive arm 20 that has a hard drive voice coil motor 22.

To ensure that the master arm 14 is accurately positioned, a laser interferometer 24 is used to measure the position of the master arm 14. This information is relayed to a master arm servo controller 26, which moves the master arm 14 to the desired track of the data storage disk in which data is to be recorded. The laser interferometer 24 detects the position of the master arm 14 by monitoring light reflected off a reflector 28 mounted on the master arm 14. This information is relayed to the master arm servo controller 26, which also receives a position command signal from an external source, such as a computer, which is programmed to coordinate servo writing.

Figure 3B:
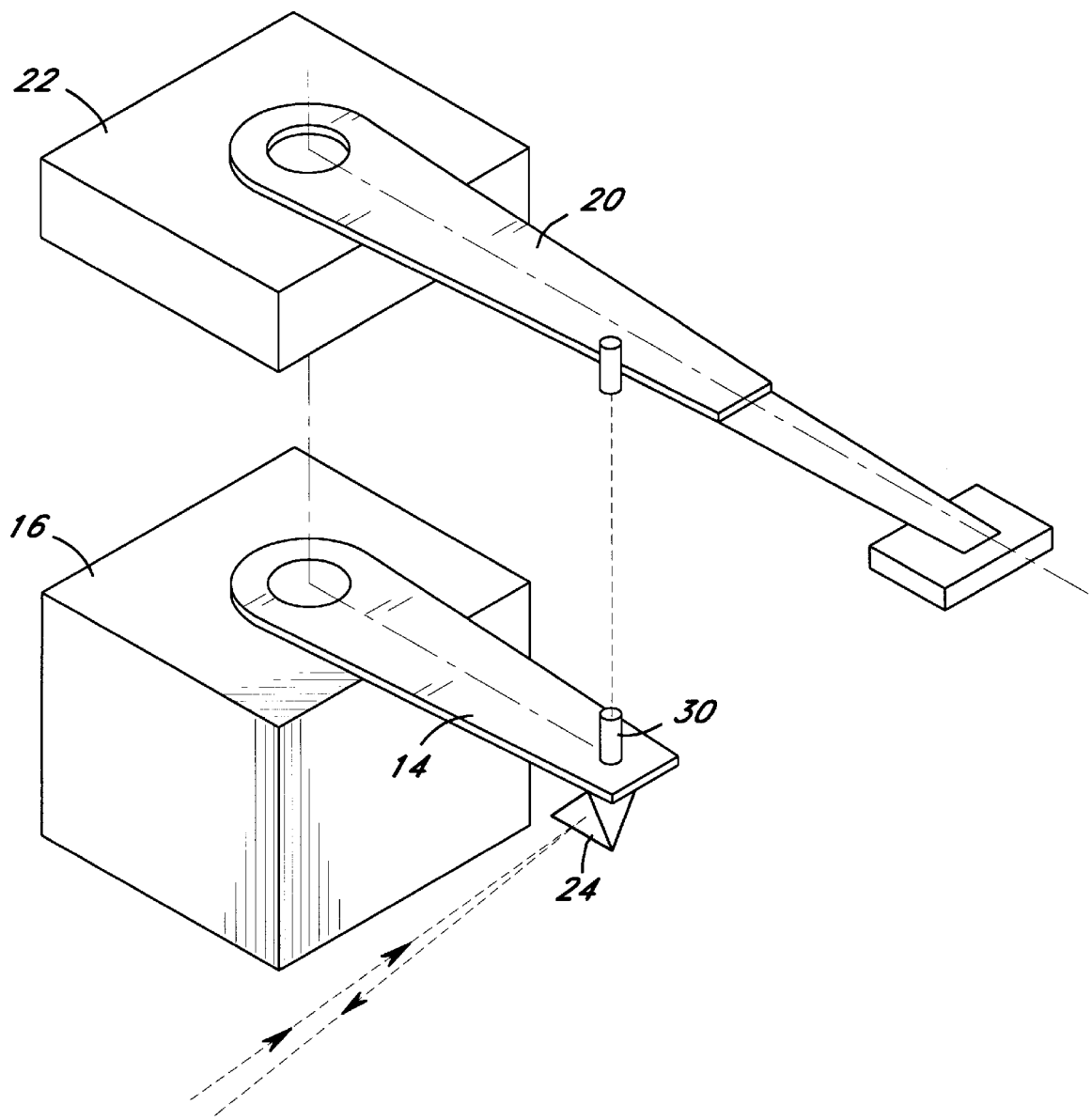
FIG. 3B is a perspective view of a portion of the servo-writing system of FIG. 3A.

A mechanical link between the master arm 14 and the hard drive arm 20 is established with the use of a mechanical push-pin 30, as shown in FIGS. 3A and 3B. The mechanical push-pin 30 is attached at one end to the master arm 14 and extends into an access slot 32 of the hard drive arm 20. The hard drive arm 20 is biased by its motor 22 to press against the side of the push pin 30 and follow the master arm 14. This mechanical positioning system enables the hard drive arm 20 to track movement of the master arm 14, and thus assure writing of servo information at the proper radius of the hard drive assembly 18.

Figure 4:
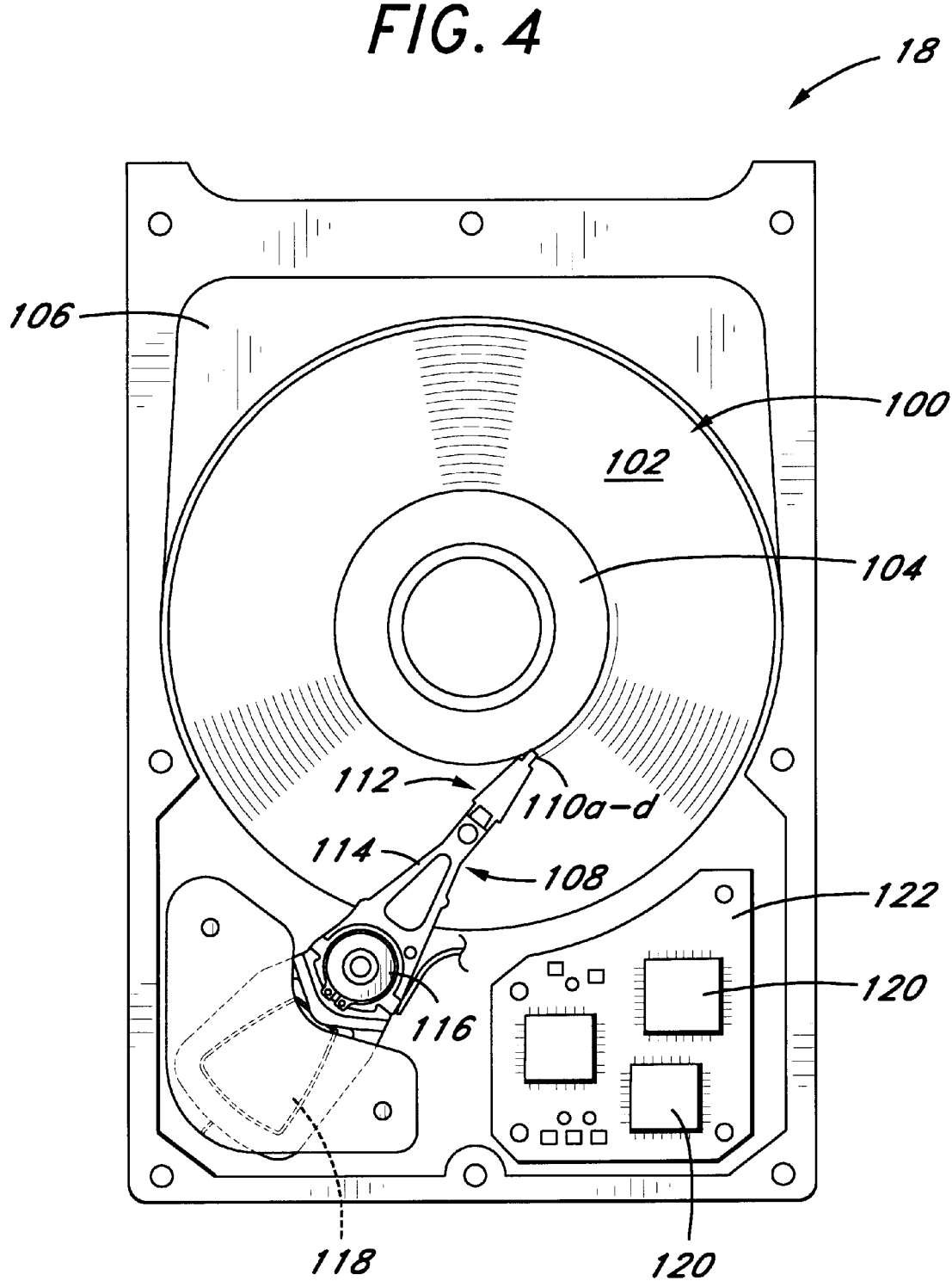
FIG. 4 illustrates a hard disk drive which utilizes one aspect of the method of the present invention.

FIG. 4 shows the hard disk drive assembly 18 of FIG. 3A. The hard disk drive 18 includes a disk pack 100 with a plurality of disks 102 that are collectively rotated by a spin motor 104. The spin motor 104 corresponds to the hard drive arm motor 22 in FIG. 3A. The spin motor 104 is mounted to a base plate 106. Also mounted to the base plate 106 is an actuator arm assembly 108. The actuator arm assembly 108 corresponds to the hard drive arm 20 in FIG. 3A. The actuator arm assembly 108 includes a number of read/write (R/W) heads 110a–d mounted to corresponding flexure arms 112. The flexure arms 112 are attached to an actuator arm 114 that can rotate about a bearing assembly 116. The assembly 108 also contains a voice coil motor 118 which moves the heads 110a–d collectively relative to the disks 102. There is typically a single head 110a, 110b, 110c, or 110d for disk head side H0, H1, H2 or H3 (not shown), respectively, of the disk pack 100. The spin motor 104, voice coil motor 118 and the R/W heads 110a–d are coupled to a number of electronic circuits 120 mounted to a printed circuit board 122. The electronic circuits 120 typically include a read channel chip, a microprocessor-based controller and a random access memory (RAM) device.

Figure 5A:
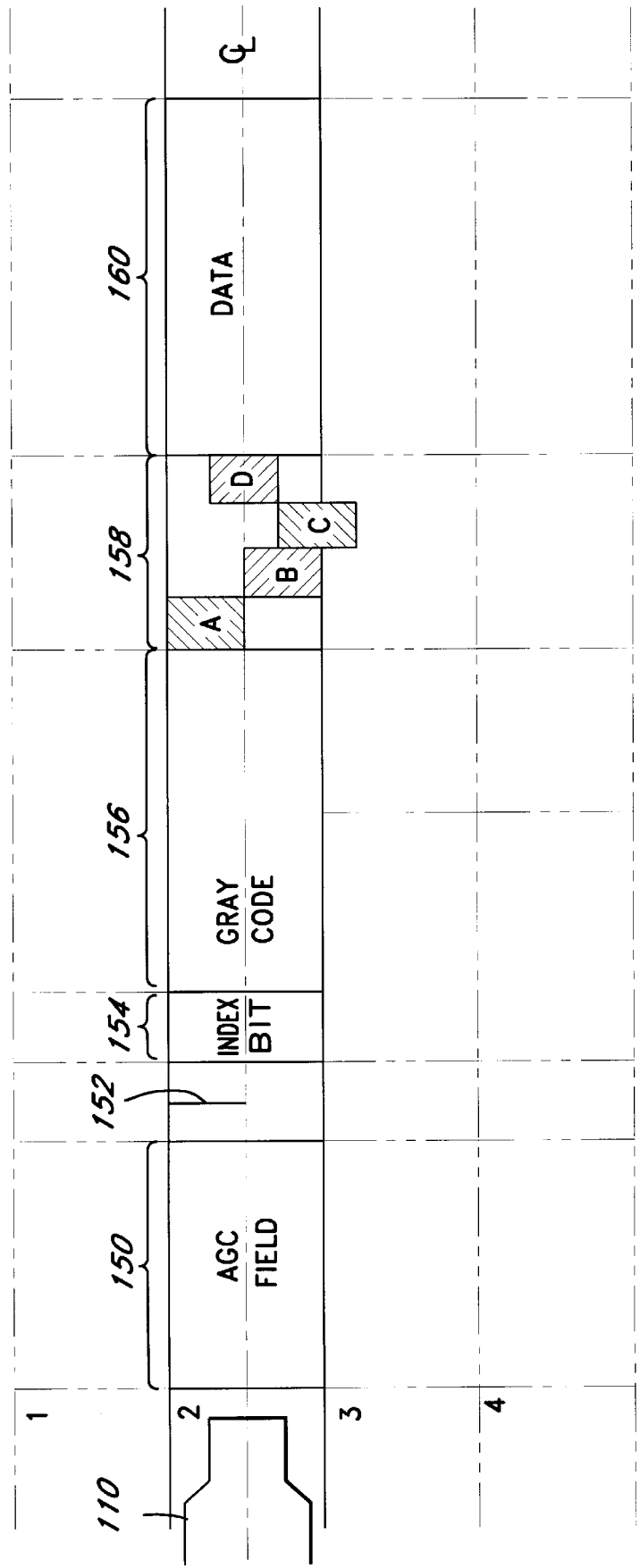
FIG. 5A illustrates sector 1, head 0 of a disk pack.

As shown in FIG. 5A, data is typically stored within sectors of radially concentric tracks located across any one of the disk heads H0–H3 of the disk pack 100. A typical sector will have a preamble field 150 which includes automatic gain control (AGC) information and synchronization information, a servo timing mark 152 which signifies the beginning of a sector, an index field 154 which indicates the beginning of the first sector of the track, a gray code field 156 that identifies the particular cylinder (tracks) of the sector, a servo field 158 which includes a number of servo bits A, B, C, D, and a data field 160 which contains the data. The electronic circuits 120 utilize the servo bits A, B, C and D to maintain the heads 110a–d on the centerline CL of a corresponding track. The heads 110a–d can magnetize and sense the magnetic field of the disk heads H0–H3.

FIG. 5B illustrates a servo sector of a disk 102 in the disk pack 100 having four disk heads H0, H1, H2 and H3 with servo information written using the stagger wedge servo writing scheme. Each disk head H0, H1, H2 and H3 has a servo field 158 and a data field 160 as described above. In writing the servo patterns on such a four-head disk pack 100, each read/write (R/W) head 110a, 110b, 110c or 110d is individually activated and directed to write a particular servo pattern in a particular sector, such as sector 1, and head (or side) H0, H1, H2 or H3 of the disk pack 100. Upon completion of the servo writing process, the particular R/W head 110a, 110b, 110c or 110d is deactivated. Thus, the servo pattern for all four heads H0–H3 of the disk pack 100 are written during a particular sector cycle.

FIG. 6 is a top view of a disk pack that is re-servo written in accordance with the teachings of the present invention. In writing the servo patterns of a rework disk, the re-servo writing procedure of the present invention first directs the master arm 14 to position the hard drive arm 20 mechanically at the extreme outside track. It then directs the R/W heads 110a–d to write the servo patterns in accordance with the stagger wedge scheme as described above. In particular, R/W head 110a is first activated and directed to write a particular servo pattern in sector 1, head (or side) H0 of the disk pack 100. Upon completion of the servo writing process, R/W head 110a is deactivated. R/W head 110b is then activated and directed to write the servo pattern in sector 1, head H1 of the disk pack. Upon completion of the servo writing process, R/W head 110b is deactivated. The same process is continued for R/W head 110c and R/W head 110d in sector 1, head H2 and sector 1, head H3 of the disk pack 100 respectively.

Upon reaching the first track that is just beyond the inner diameter crash stop, for example, at track 200, the re-servo writing procedure of the present invention directs each one of the heads 110a–d to write the servo pattern and data for one complete track independently of the other heads. By writing data on the tracks after the new servo pattern is written, it ensures that any old servo pattern existing will be written over. This re-servo writing procedure is accomplished, for example, by first directing R/W head 110a to write the servo pattern and data for one complete track. Upon completion of this task, the second R/W head 110b is directed to write the servo pattern and data for a corresponding complete track. Next, the third R/W head 110c is directed to write the servo pattern and data for the corresponding complete track. Finally, the fourth R/W head 110d is directed to write the servo pattern and data for the corresponding complete track. This procedure is performed from the first to the fiftieth tracks beyond the inner diameter crash stop.

During the power-up sequence, the actuator arm assembly 108 is biased beyond the inner diameter crash stop where only the new servo pattern exists. The R/W heads 110a–d are then directed to locate the beginning of the new servo pattern, and to synchronize reading of the new servo pattern. Upon completion of this process, the calibration process is initiated.

Figure 7A:
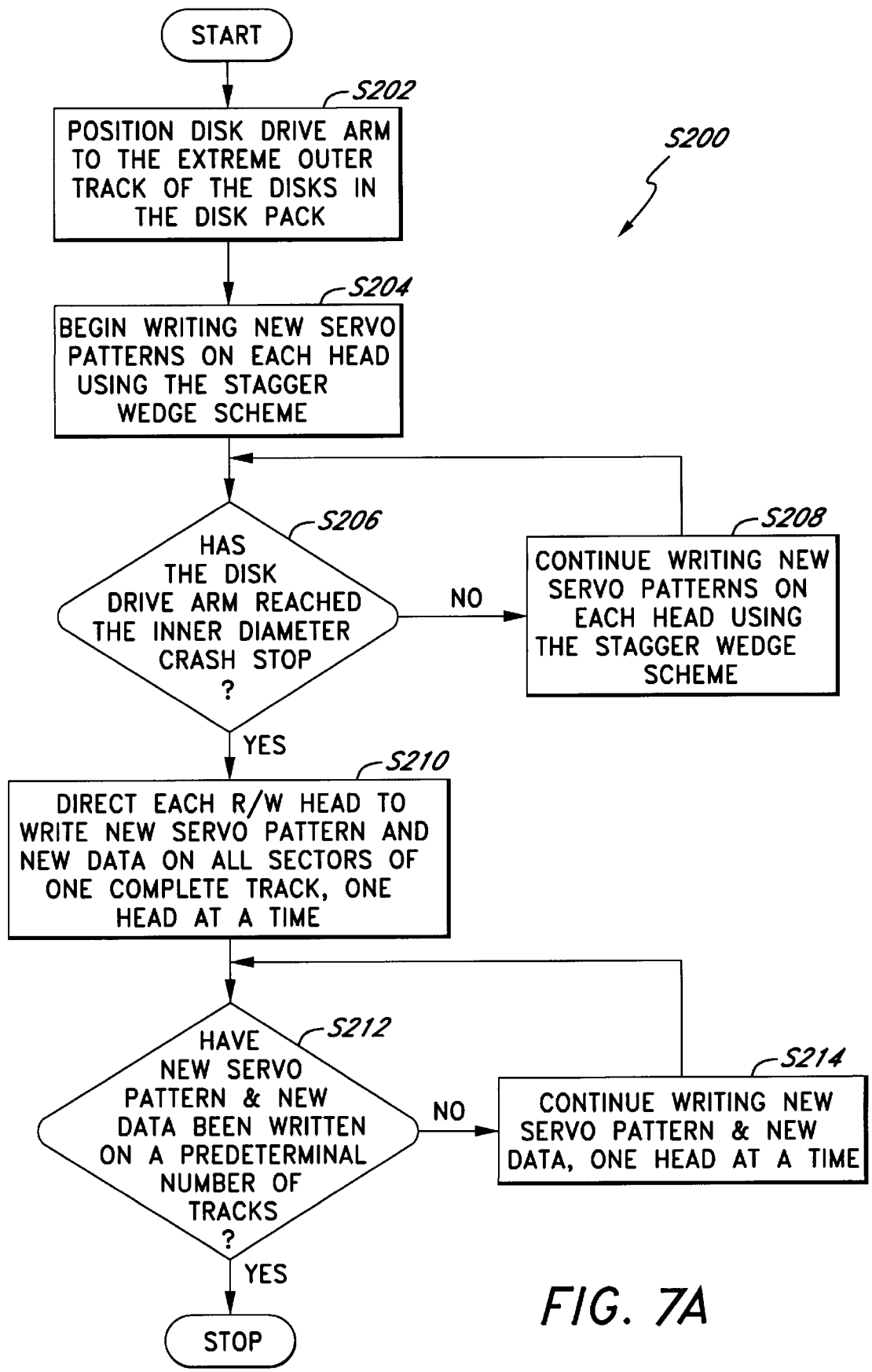
FIGS. 7A and 7B are flowcharts illustrating the process of rewriting servo information in accordance with the teachings of the present invention.

FIG. 7A is a flowchart illustrating the process of rewriting servo information in accordance with the teachings of the present invention. Beginning from a start state, the process S200 of the present invention proceeds to process step S202 where it directs the master drive arm 14 (FIG. 3A) to position the hard drive arm 20 to the extreme outer track of the disks 102 in the disk pack. The process S200 then directs the R/W heads 110a–d to begin writing new servo patterns on each head H0–H3 of the disk pack 100 using the stagger wedge scheme, as shown in process step S204. In particular, after the current driving R/W head 110a is first turned on, the R/W head 110a is directed to write the new servo pattern on head H0 of the disk pack 100. Upon completing this task, the R/W head 110a is turned off, while the R/W head 110b is turned on. The servo controller 132 next directs the R/W head 110b to write the new servo pattern on head H1 of the disk pack 100. When this is done, the R/W head 110b is turned off, while the R/W head 110c is turned on. The servo controller 132 then directs the R/W head 110c to write the new servo pattern on head H2 of the disk pack 100. When the R/W head 110c has completed writing the new servo pattern, it is turned off, while the R/W head 110d is turned on and directed to write the new servo pattern on head H3 of the disk pack 100.

The process S200 then determines if the actuator arm assembly 108 has reached the inner diameter crash stop of the hard disk drive 18, as shown in decision step S206. If not, the process S200 proceeds to process step S208, where it directs the heads 110a–d to continue writing the new servo patterns on each head H0–H3 of the disk pack 100 using the staggered wedge scheme, as shown in process step S208. The position of the actuator arm assembly 108 is continually monitored to determine if it has reached the inner diameter crash stop.

If it is determined at decision step S206 that the actuator arm assembly 108 has reached the inner diameter crash stop, the process S200 proceeds to process step S210, where it directs each R/W head 110a–d to write the new servo patterns and new data on all sectors of one complete track. This is accomplished by activating one R/W head 110a, 110b, 110c or 110d, for one complete track, at a time. For example, R/W head 110a will be turned on, while R/W heads 110b–d are turned off. The R/W head 110a will be directed to write the new servo patterns and new data on all sectors of one complete track 200. By doing this, any old servo patterns will essentially be written over by the new servo pattern and new data. Upon completion of this task, the R/W head 110a will be turned off, while the R/W head 110b is turned on and directed to write the new servo patterns and new data on all sectors of the same complete track 200 located on head H1. This process S214 is continued for a predetermined number of tracks, such as 50 tracks.

The process S200 then advances to decision step S212, where it determined if the new servo patterns and the new data have been written on a predetermined number of tracks over each head H0–H3. If not, the process S200 proceeds to process step S214, where it directs the R/W heads 110a–d to continue writing the new servo patterns and the new data, one head H0, H1, H2 or H3 at a time. The process S214 then proceeds to decision step S212 to determine if the new servo patterns and new data have been written on a predetermined number of tracks.

If it is decided, at decision step S212, that the new servo patterns and new data have been written on the predetermined number of tracks, the process S200 terminates.

Figure 7B:
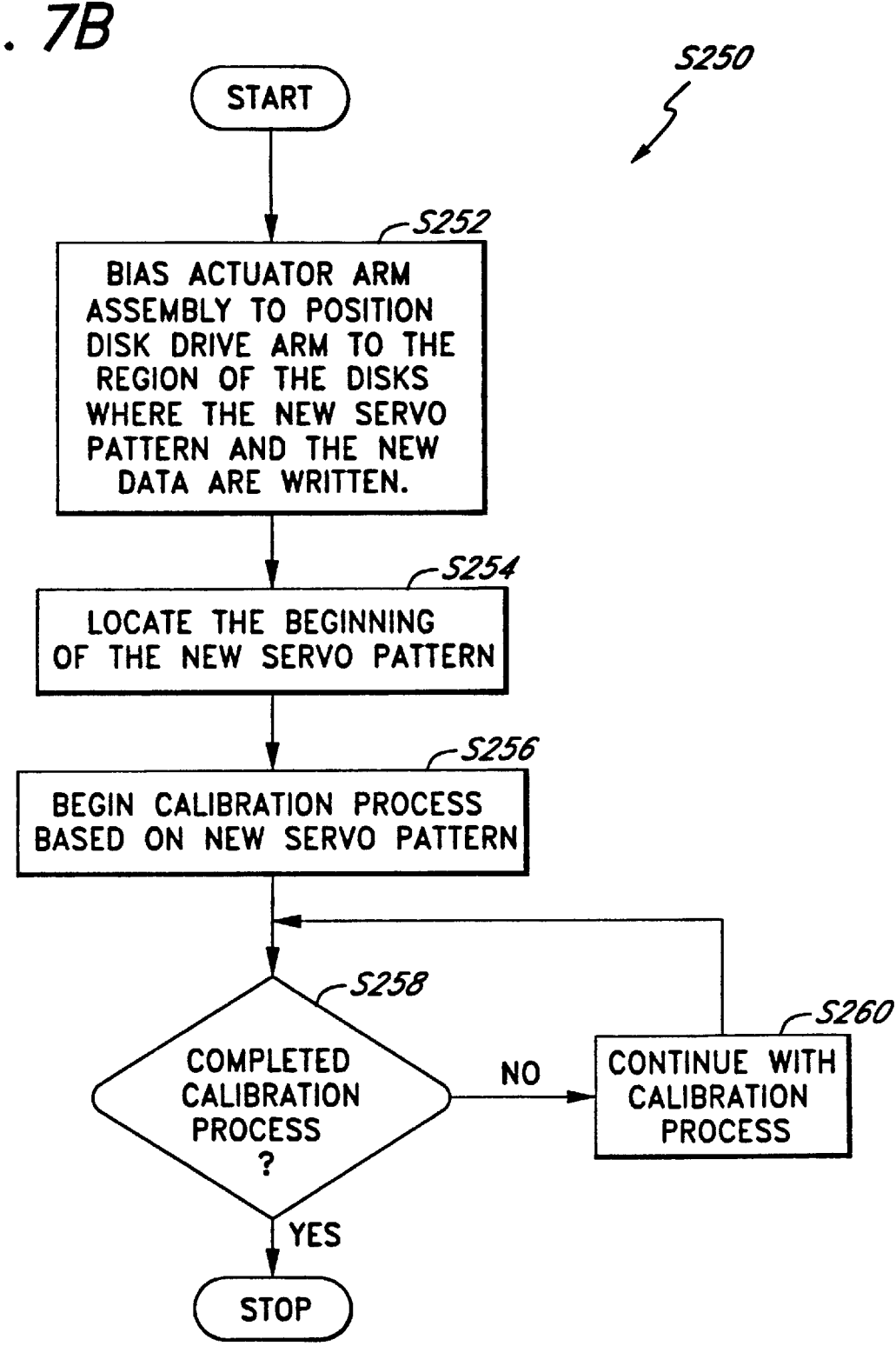

FIG. 7B is a flow chart of the process S250 of reading the new servo pattern, in accordance with the teachings of the present invention. Upon completion of the re-servo writing process S200, the reading of the new servo patterns may begin. This process S250 is performed under the control of the master arm servo controller 26 of the master drive assembly 12.

Beginning from a start state, the process S250 directs the master arm 14 to position the actuator arm assembly 108 to the region of the disk pack 100 where the new servo patterns and the new data are written, for instance, on track 200 (FIG. 7). The process S250 then directs the heads 110a–d to locate the beginning of the new servo pattern, as shown in process step S254. This is accomplished by synchronizing with the servo timing mark 152 of the track 200. Next, the process S250 directs the heads 110a–d to proceed with the calibration process for the disk pack 100 based on the new servo pattern, shown in process step S256. The process S250 then advances to decision step S258, where it queries if the calibration process is completed. If not, the process S250 proceeds to process step S260, where it continues with the calibration process. It then returns to decision step S258. If it is determined at decision step S258 that the calibration process is completed, the process S250 terminates.

It is understood that the present invention may be used to rewrite servo information on a disk using any other servo writing technique. For example, the present invention may be used to rewrite servo information using an aligned servo writing scheme instead of a stagger wedge scheme. In addition, the present invention may be used to write servo information on a first plurality of tracks, and then to write both servo information and data on a complete track, on a second plurality of tracks. In this manner, the new servo information may be written on the disk with or without going beyond the inner diameter crash stop of a disk pack.

Through the implementation of the technique of the present invention, servo information may be rewritten on the disk heads of a disk pack without first having to erase the entire disk pack. As a result, the manufacturing productivity of hard disk drives may be significantly increased, while decreasing the cost of reworking such disk packs.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. A method for rewriting servo information on at least one disk of a hard disk drive assembly that has an actuator arm assembly that can move relative to the disk and write a new servo pattern and data, the disk including a plurality of tracks having existing servo information, comprising:

(a) writing only a new servo pattern in a track;

(b) moving the actuator arm assembly to an adjacent track;

(c) repeating acts (a) and (b) until the actual arm assembly is adjacent to a selected track at a predetermined position of the disk; and (d) writing the new servo pattern and data into the selected track until the selected track is completely rewritten with the new servo pattern and data;

(e) moving the actuator arm assembly to the selected track to read the new servo pattern during a power on sequence.

2. The method of claim 1 wherein the predetermined position of the disk is located beyond an inner crash stop position of the disk.

3. The method of claim 2 further comprising (f) sequentially repeating acts (a) through (c) for each surface of each disk until the new servo pattern and data are written into the selected track of each surface of each disk.

4. The method of claim 3 further comprising:

(g) writing the new servo pattern and data into a subsequent track of the plurality of tracks located across the first surface of the first disk; and (h) sequentially repeating act (g) for each surface of each disk until the new servo pattern and data are written into a subsequent track of each surface of each disk.

5. The method of claim 1, further comprising:

locating the new servo pattern within the selected track located at the predetermined position of the disk;

reading the new servo pattern from the selected track; and providing calibration information for the disk based on the new servo pattern.

6. The method of claim 1 wherein the new servo pattern is written into the plurality of tracks using a selected servo information writing technique.

7. The method of claim 6 wherein the servo information writing technique comprises one of an aligned servo writing scheme and a stagger wedge scheme.

* * * * *